United States Patent [19]
Sheu et al.

[11] Patent Number: 5,801,962
[45] Date of Patent: Sep. 1, 1998

[54] METHOD AND APPARATUS FOR CALIBRATING IMAGE SYSTEM

[75] Inventors: Rich Sheu; Ming-Song Wang; Jung-Fu Wu, all of Hsinchu, Taiwan

[73] Assignee: Must System Inc., Hsinchu, Taiwan

[21] Appl. No.: 626,141

[22] Filed: Apr. 5, 1996

[51] Int. Cl.$^6$ ................................. H04N 1/00
[52] U.S. Cl. .............. 364/526; 364/571.01; 358/406; 358/504
[58] Field of Search ............... 364/526, 571.01, 364/571.02; 348/615; 382/274; 395/126, 128, 131, 132; 358/406, 461, 463, 494, 504, 509, 518, 505, 520, 475, 474

[56] References Cited

U.S. PATENT DOCUMENTS

| | | | |
|---|---|---|---|
| 4,523,229 | 6/1985 | Kanmoto | 358/163 |
| 4,829,379 | 5/1989 | Takaki | 358/163 |
| 4,888,492 | 12/1989 | Arimoto | 250/578 |
| 5,062,144 | 10/1991 | Murakami | 382/52 |
| 5,266,804 | 11/1993 | Shimizu | 250/584 |
| 5,317,421 | 5/1994 | Ito | 358/464 |
| 5,347,370 | 9/1994 | Ishihara et al. | 358/461 |
| 5,644,512 | 7/1997 | Chernoff et al. | 364/571.02 |

*Primary Examiner*—Emanuel Todd Voeltz
*Assistant Examiner*—Tony M. Cole
*Attorney, Agent, or Firm*—Ladas & Parry

[57] ABSTRACT

A method and apparatus for calibrating an image system is disclosed. The method according to the present invention includes inputting data by scanning a plurality of lines into a computer, and analyzing the input data for generating intensity of the scanned lines. The inputting step is repeated when the intensity is less than a low threshold value or the intensity is higher than a high threshold value. Next, any scanned line that includes at least a special point is filtered out. After averaging the corresponding points of the scanned lines not filtered out in order to generate a calibration line, a predetermined number of points of the calibration line are averaged to generate a reference point, wherein the predetermined number of points of the calibration line are brighter than other points of the calibrated line. Finally, the calibration data are obtained by taking ratio of the reference point to each of the points of the calibration line.

4 Claims, 7 Drawing Sheets

METHOD AND APPARATUS FOR CALIBRATING IMAGE SYSTEM

BACKGROUND OF THE INVENTION

1. Field of the Invention

The present invention relates to a method and apparatus for calibrating an image system, and more particularly to a method and apparatus for generating calibration data and for calibrating an image scanner.

2. Description of the Prior Art

Owing to the photo-response non-uniformity (PRNO) of the light source, the mirror, the lens and the charge-coupled devices(CCDs), the aging of the system or the effect resulting from a dusty environment, an image system, such as a scanner, typically suffers problems, such as image defects or distortion of intensity, which require a method to compensate, or calibrate when the scanner is in operation.

FIG. 1 illustrates a typical method, called two-level or black & white method in the prior art, which uses a calibration plate composed of a block (RB) block 21 and a white(RW) 22 as shown in FIG. 2A. The calibration plate is firstly scanned, in step 11. The data collected from the scanning include a black reference data RBc(RBc ≧ 1) and a white RWc(RWc ≦ 255) respectively from the black block 21 and the white block 22. The spectrum of a scanned image generated in step 12 is shown in FIG. 2B, wherein the highest value is designated as RWs and the least value as RBs. While the value of the scanned image is less than or equal to 128, i.e., the middle value of the available levels, the "YES" branch is selected in step 13, and the image data is weighted or multiplied, step 14, by the ratio RBc/RBs. Otherwise, the image data is weighted or multiplied, step 15, by the ratio RWc/RWs.

There are some disadvantages associated with the typical method described above: (1) the calibration plate like that shown in FIG. 2A is manufactured or provided to the user only by the manufactures of the scanners; (2) when this calibration plate is lost, the replacement is not available in an ordinary stationery store; (3) a dirty calibration plate will render the calibration process useless; (4) the method illustrated in FIG. 1 results in image distortion near the middle value in the spectrum of FIG. 2B.

SUMMARY OF THE INVENTION

It is therefore a primary object of this invention to provide an improved method and apparatus for compensating the problems, such as the photo-response non-uniformity of the light source, or the aging of the system.

It is a further object of the invention to provide a low cost and easy to operate method and apparatus which requires only an ordinary blank paper available in a stationery store everywhere instead of a calibration plate specially made for the user.

In accordance with the present invention, a calibration method is provided. In one embodiment, data are input by scanning a plurality of lines into a computer and the input data are then analyzed to generate intensity of the scanned lines. The inputting step is repeated when the intensity is less than a low threshold value or the intensity is higher than a high threshold value. Next, any scanned line that includes at least a special point is filtered out. After averaging the corresponding points of the scanned lines not filtered out in order to generate a calibration line, a predetermined number of points of the calibration line are averaged to generate a reference point, wherein the predetermined number of points of the calibration line are brighter than other points of the calibrated line. Calibration data are then obtained by taking ratio of the reference point to each of the points of the calibration line. Thereafter, scanned image data are multiplied by the corresponding calibration data to generate the calibrated image, and the scanned image data are replaced with a brightest image value when overflow occurs after the multiplying step. Finally, the calibrated image is displayed.

DESCRIPTION OF THE PREFERRED EMBODIMENT

Figure 1:
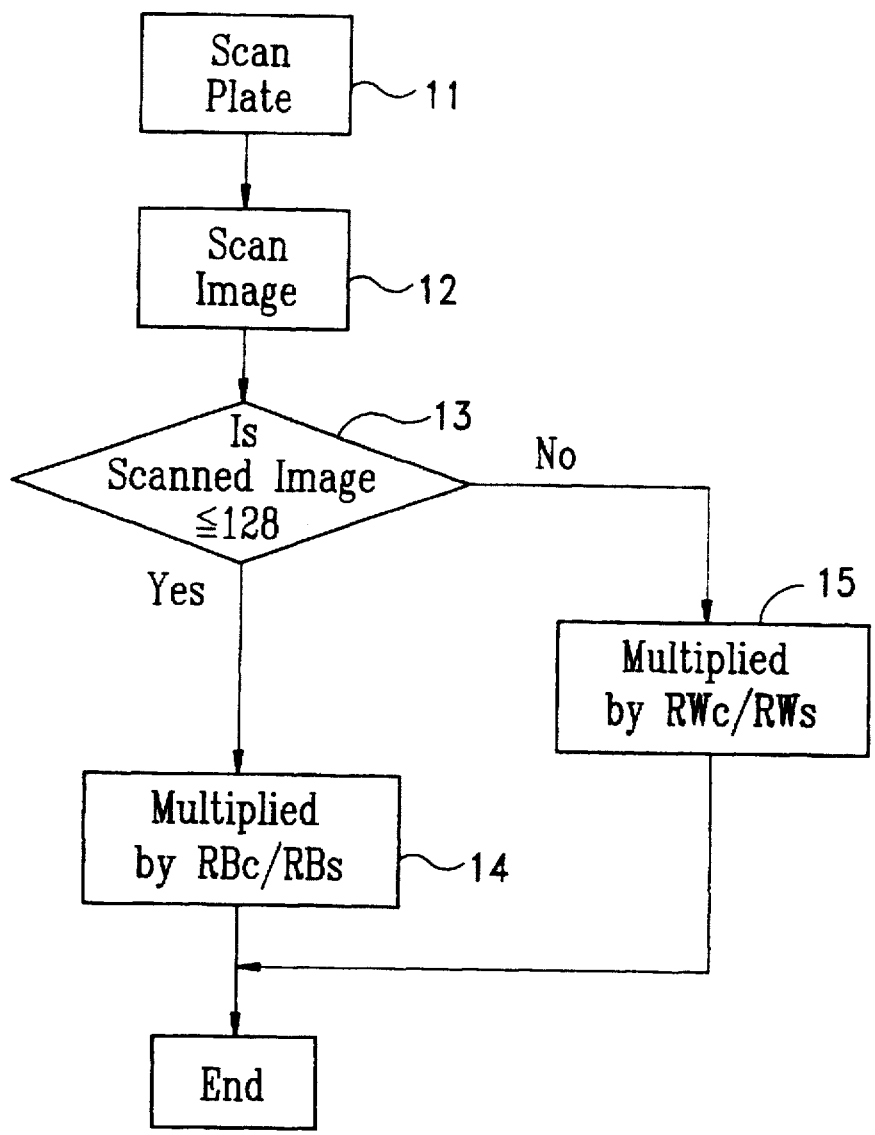
FIG. 1 is a flow diagram of a typical method in the prior art.
Figure 2A:
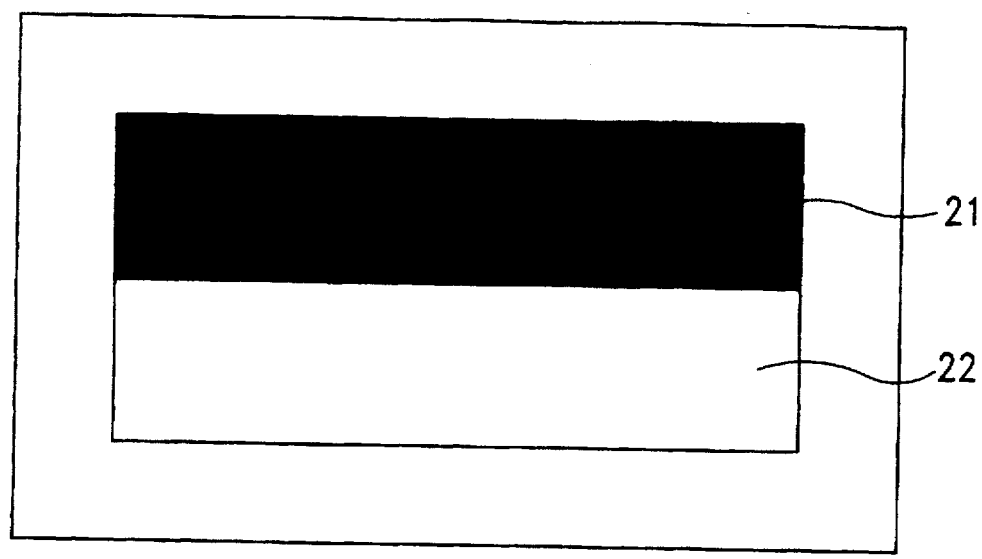
FIG. 2A is a calibration plate used in the prior art.
Figure 2B:
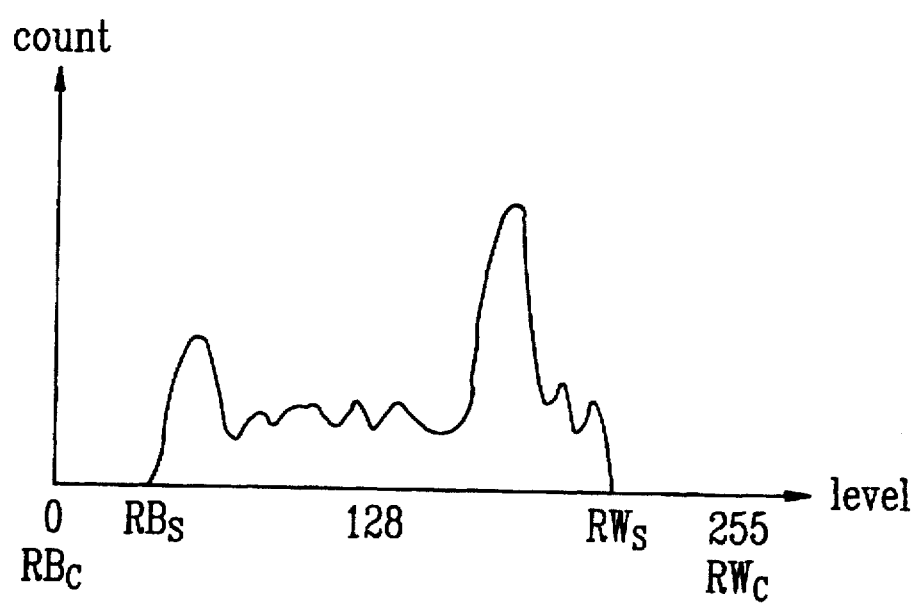
FIG. 2B is a spectrum of data collected in the method of FIG. 1.
Figure 3:
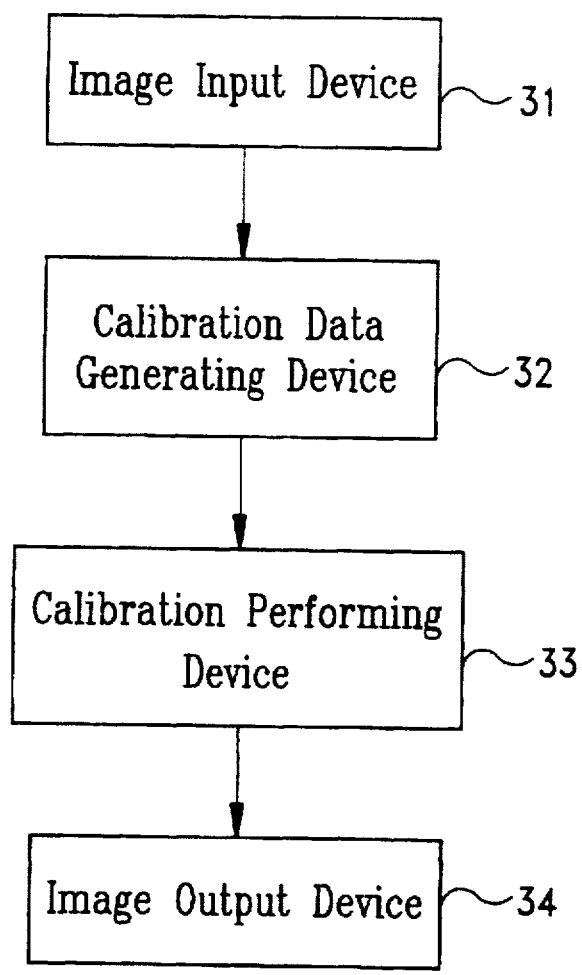
FIG. 3 shows the present invention for calibration in an image system.

FIG. 3 illustrates a block diagram an apparatus according to the present invention for calibration in an image system. The image data scanned by an image input device 31, which is typically a scanner, are fed to a calibration data generating device 32 for generating and storing the calibration data. The calibration data are then fed to a calibration performing device 33 for calibrating the image input device 31, e.g. a scanner, to compensate some problems encountered in using a scanner. The problem may be the photo-response non-uniformity(PRNU) of the charge-coupled devices and mirrors, the aging of the light source and the charge-coupled device, or the effect owing to a dusty environment. The scanned image data after performing calibration are then input to an image output device 34, e.g. a video monitor, for displaying the image data without distortion of light intensity. The calibration data generating device 32 and the calibration performing device 33 together feature in the present invention, and will be described in full details hereinafter, in company with FIG. 4 and FIG. 7.

Figure 4:
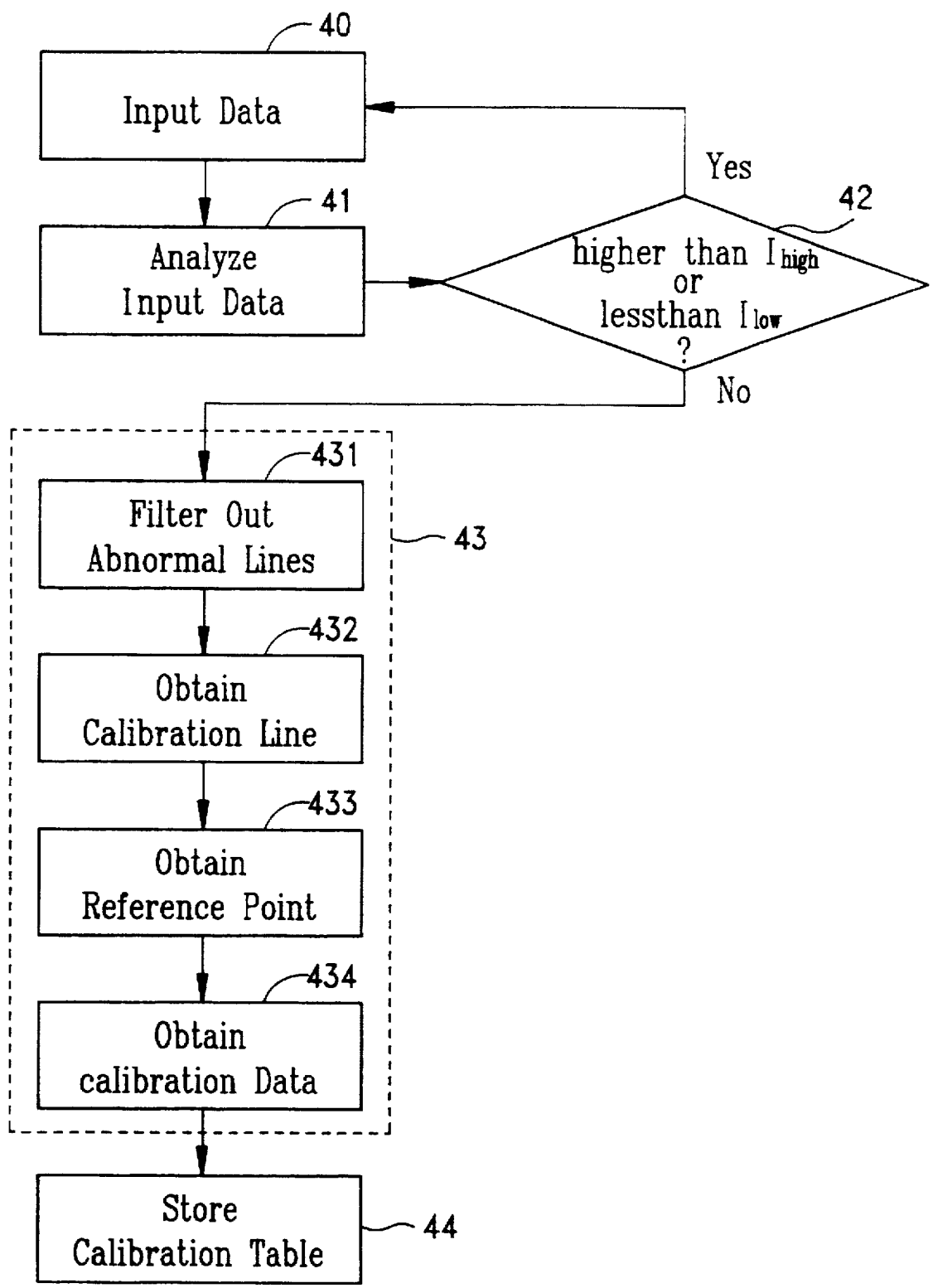
FIG. 4 is the flow diagram of the present invention for generating calibration data.

FIG. 4 shows a flow diagram of the calibration data generating device 32 (FIG.3), which generates the calibration data or the calibration table and then stores the calibration data into a computer. Initially some data are input, step 40, by scanning some lines, e.g., 100 lines, of one blank paper available in any stationery store. As usual the characteristics of a light source, e.g., a lamp, are unstable or too dim to be used for the purpose of calibration at the beginning of utilizing a scanner. On the other hand, the brightness may be too high after the scanner has been working for a long period of time, so that the data collected therefrom are of no use for calibration. Accordingly the collected data are analyzed, step 41, to determine whether the situations described above are met, i.e., to examine the intensity of the scanned lines whether the intensity is higher than a pre-defined high threshold value($I_{high}$) or less than a pre-defined low threshold value($I_{Low}$), step 42. If there is any condition met, the "YES" branch is selected in step 42 and the data are discarded and some more data are input, step 40, again by scanning some more lines. Normally the "NO" branch is selected in step 42 and the flow is proceeded to process the input data, steps designated wholly as 43, for generating calibration data which will be read out and accordingly be used for adjusting image data by the calibration performing device 33 of FIG. 3.

The input data lines, e.g., N lines, may unfortunately contain a few of abnormal lines whose intensity deviates greatly beyond a pre-defined critical value, from the intensity of the other input data lines. The abnormal lines are filtered out, step 431 or are discarded, resulting in N' effective data lines. By way of illustration, the N' effective lines could be expressed in an matrix form Li[m], where i=1,2, ... ,N' and m=1,2, ... ,M, and could be shown as follows, wherein the first index of every pixel indicates the line number and the second index indicates the position of the pixel, supposing an order from left to right.

| $L_{11}$ | $L_{12}$ | $L_{13}$ | ... | $L_{1M}$ | ← | line 1 |
|---|---|---|---|---|---|---|
| $L_{21}$ | $L_{22}$ | $L_{23}$ | ... | $L_{2M}$ | ← | line 2 |
| . | . | . |  | . |  | . |
| . | . | . |  | . |  | . |
| . | . | . |  | . |  | . |
| $L_{N'1}$ | $L_{N'2}$ | $L_{N'3}$ | ... | $L_{N'M}$ | ← | line N' |

Figure 5:
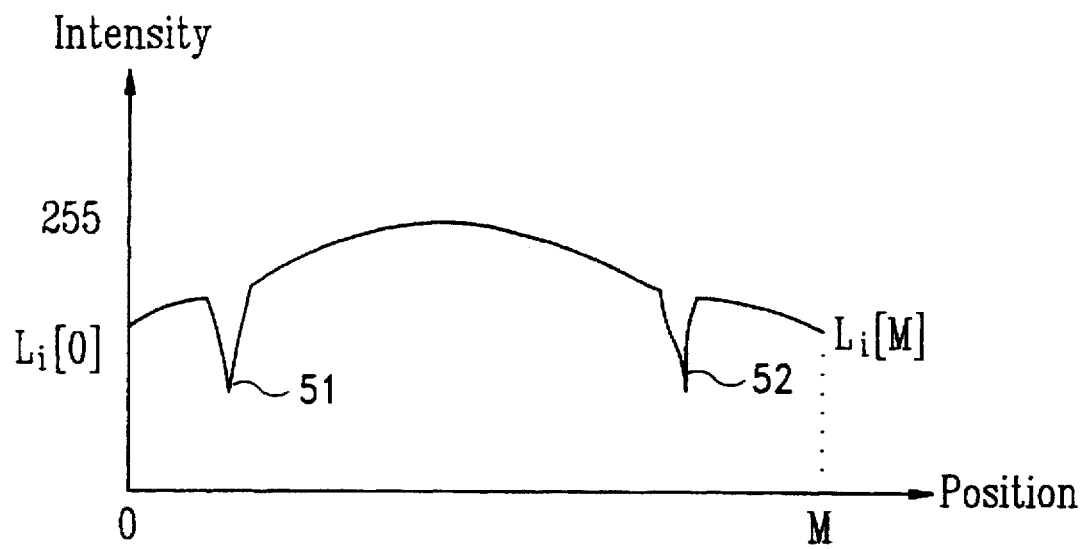
FIG. 5 is the intensity of a data line collected by scanning an ordinary blank paper.

FIG. 5 shows the intensity of one of the N' lines, where valleys 51,52 are special points owing to, for example, stains on the blank paper used for inputting data. Those lines that contain special points should be discarded, resulting in N" lines used for next processing. In the next step, the corresponding points in the same column of the lines shown above are averaged for every column, resulting in a calibration line, $L_R[m]$, where m=1,2, ... ,M,(step 432). A compact form for this operation is expressed as follows:

$$L_R[m] = \sum_{i=1}^{N''} (Li[m]/N''), N'' \leq N'$$

Figure 6:
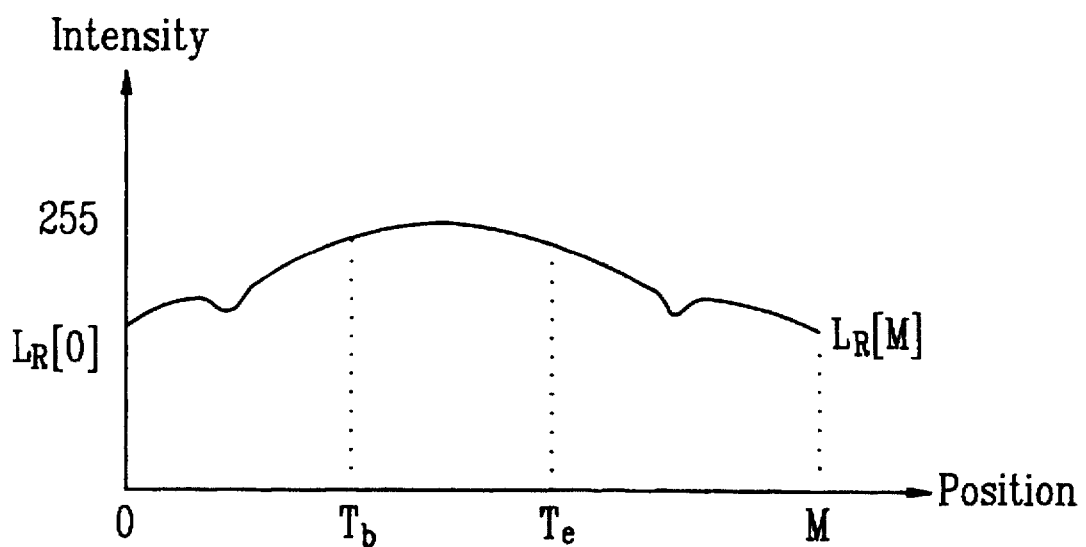
FIG. 6 is the intensity of the calibration line.

The intensity of the calibration line $L_R[m]$ is typically shown in FIG. 6 for a system of 8 bits, i.e., 256 levels of gray. In order to save time and system memory in the step 432, the points could be chosen every several points. For example, only one point is chosen for every group composed of five consecutive points.

Furthermore, a few of brightest points, say 30 points, on the calibration line are chosen and are averaged to obtain a reference point, (step 433). Referring to FIG. 6 again, points from Tb through Te are chosen, and the value of the reference point, $L_R[T]$, is determined by the following operation:

$$L_R[T] = \sum_{i=Tb}^{Te} L_R[i]/(Te - Tb + 1)$$

Finally, the calibration data could be attained, ( step 434), by taking the ratio of the value of the reference point, $L_R[T]$, to the values of other points, $L_R[m]$, on the calibration line. The resultant values are then stored, ( step 44 ) in a calibration table on a computer.

Figure 7:
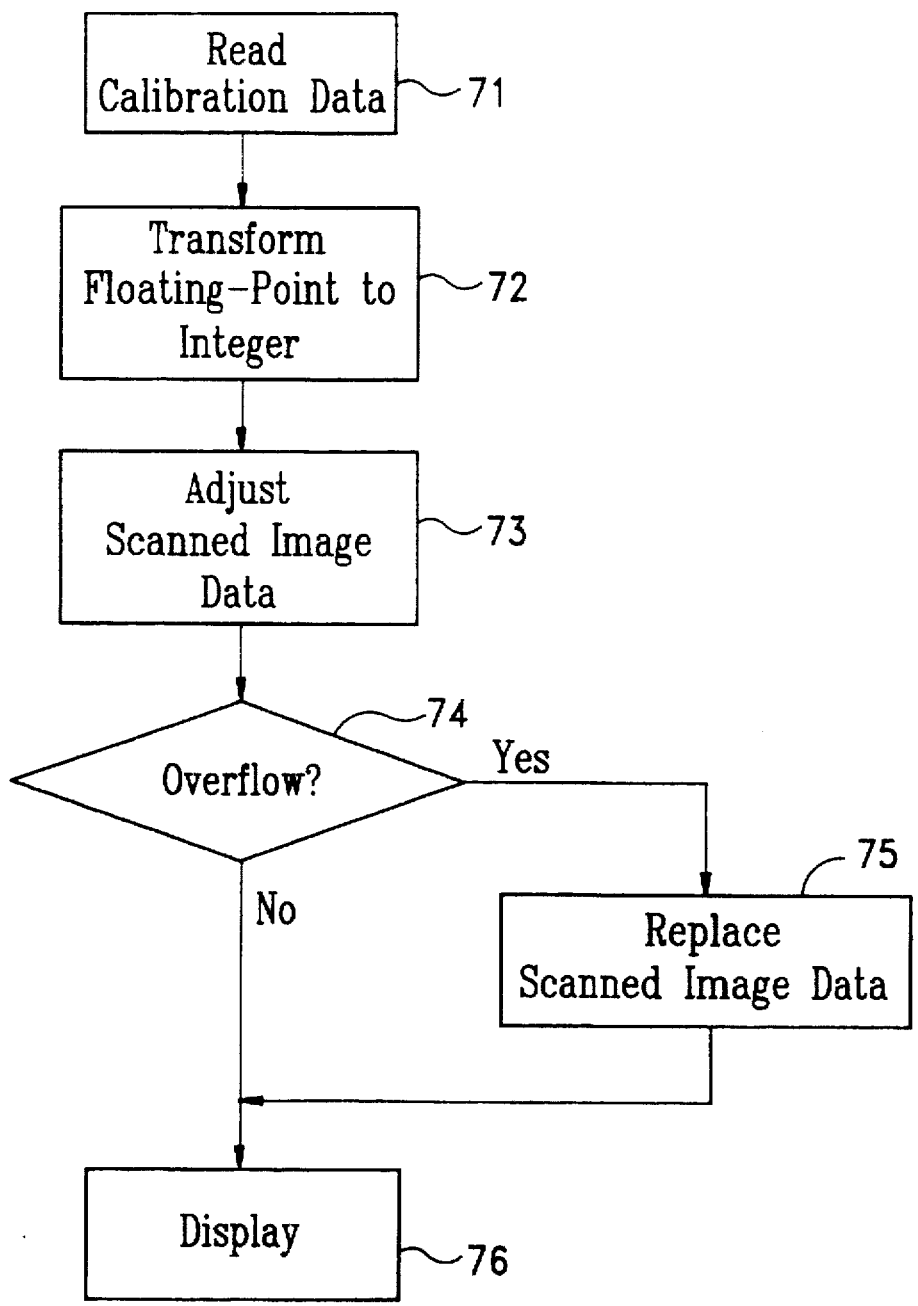
FIG. 7 is a flow diagram of the present invention for calibrating an image scanner.

FIG. 7 illustrates the calibration performing device 33 of in FIG. 3, which reads the calibration data of the calibration table and adjusts scanned image data according to the calibration data. The calibration data are read out, (step 71), and its format is transformed from floating-point to integer,(c step 72) in order to save time and system memory. The scanned image data is then weighted, or multiplied,(step 73), by the corresponding calibration data to compensate, for example, for the non-uniformity of light source. When an overflow occurs after adjusting process of e.g., step 73, the "YES" branch is selected in step 74 and the value of the brightest image, 255 in a 8-bit system, is used to replace, (step 75), the resultant value from (step 76), and is finally displayed, step 76. Normally the "NO" branch in step 74 is selected and the calibrated image is displayed,in step 76.

Figure 8:
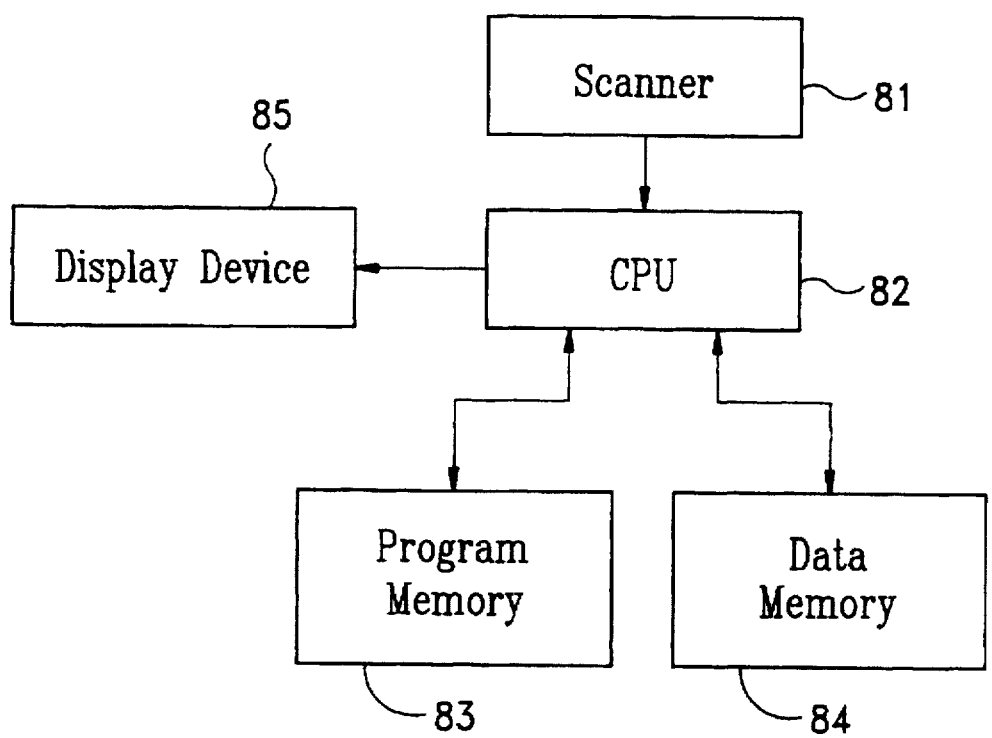
FIG. 8 is a functional block diagram of the present invention for generating calibration data and for calibrating an image system.

FIG. 8 illustrates an apparatus for practicing this invention. A central processing unit (CPU) 82 is coupled to a program memory 83, a data memory 84 and a scanner 81. The central processing unit 82 is also coupled to a video monitor 85 for providing a visual display. A program written for performing calibration of an image device is stored in the program memory 83, which accomplishes two major tasks, that is, firstly generating and storing calibration data in the data memory 84, and secondly calibrating the scanned image data of the image device for compensating the aging of the device or the effect owing to a dusty environment. The central processing unit 82, the program memory 83 and the data memory 84 could all reside in a personal computer with the program loaded from a disk drive, or could be reside in the scanner 81 with the program also residing in the scanner 81 in a firmware manner.

Although specific embodiments have been illustrated and described, it will be obvious to those skilled in the art that various modification may be made without departing from the spirit which is intended to be limited solely by the appended claims.

What is claimed is:

1. A method for generating calibration data in an image system, comprising:

inputting data by scanning a plurality of lines into a computer;

analyzing said input data for generating intensity of the scanned lines;

repeating the inputting step when the intensity is less than a low threshold value or the intensity is higher than a high threshold value;

filtering out any scanned line that includes at least a special point;

averaging the corresponding points of the scanned lines not filtered out to generate a calibration line;

averaging a predetermined number of points of the calibration line to generate a reference point, said predetermined number of points of the calibration line are brighter than other points of the calibrated line; and obtaining the calibration data by taking ratio of the reference point to each of the points of the calibration line.

2. The method according to claim 1, further comprising storing the calibration data on the computer.

3. The method according to claim 1, wherein said corresponding points of the scanned lines not filtered out are taken every several points.

4. A calibration method, comprising:

inputting data by scanning a plurality of lines into a computer;

analyzing said input data for generating intensity of the scanned lines;

repeating the inputting step when the intensity is less than a low threshold value or the intensity is higher than a high threshold value;

filtering out any scanned line that includes at least a special point;

averaging the corresponding points of the scanned lines not filtered out to generate a calibration line;

averaging a predetermined number of points of the calibration line to generate a reference point, said predetermined number of points of the calibration line are brighter than other points of the calibrated line;

obtaining the calibration data by taking ratio of the reference point to each of the points of the calibration line;

multiplying scanned image data by the corresponding calibration data to generate calibrated image;

replacing the scanned image data with a brightest image value when overflow occurs after the multiplying step; and displaying the calibrated image.

* * * * *